United States Patent
Marino et al.

(10) Patent No.: US 6,943,536 B2
(45) Date of Patent: Sep. 13, 2005

(54) POWER SUPPLY CIRCUIT FOR CHARGING A BOOTSTRAP CAPACITOR

(75) Inventors: Filippo Marino, Tremestieri Etneo (IT); Vincenzo Campo, Valledolmo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/318,336

(22) Filed: Dec. 11, 2002

(65) Prior Publication Data

US 2003/0128019 A1 Jul. 10, 2003

(30) Foreign Application Priority Data

Dec. 11, 2001 (IT) ...................................... MI2001A2605

(51) Int. Cl.[7] .............................................. G05F 1/40
(52) U.S. Cl. ...................................... 323/288; 327/589
(58) Field of Search ................................ 323/283, 288, 323/284, 224; 327/589, 321

(56) References Cited

U.S. PATENT DOCUMENTS 5,705,919 A * 1/1998 Wilcox ........................ 323/282
5,959,442 A * 9/1999 Hallberg et al. ............. 323/282
6,396,251 B2 * 5/2002 Corva et al. ................. 323/283
6,489,758 B2 * 12/2002 Moriconi et al. ............ 323/288

* cited by examiner

*Primary Examiner*—Shawn Riley
(74) *Attorney, Agent, or Firm*—Lisa K. Jorgenson; Bryan A. Santarelli; Graybeal Jackson Haley LLP

(57) ABSTRACT

A switching power supply circuit is provided for capacitor charging, wherein a power device is coupled to a terminal node of a capacitor to be charged and has a control terminal coupled to the output of an associated drive circuit. This circuit includes a second power element being associated with the first power device, coupled to said terminal node, and provided with a control terminal which is connected directly to the output of respective drive logic. The second power element is driven to turn on when a voltage below a predetermined minimum is present at the capacitor, thereby pulling the voltage at the terminal node to ground and further charging the capacitor.

22 Claims, 7 Drawing Sheets

POWER SUPPLY CIRCUIT FOR CHARGING A BOOTSTRAP CAPACITOR

CROSS-REFERENCE TO RELATED APPLICATION

The present application claims priority from Italian patent application No. MI2001A002605, filed Dec. 11, 2001, which is incorporated by reference.

TECHNICAL FIELD

The present invention relates generally to a power supply circuit for optimum bootstrap capacitor charging. In particular, the invention relates to a switching power supply circuit for the optimum charging of a bootstrap capacitor, wherein a power device is connected to a terminal node of the capacitor to be charged and has a control terminal connected to the output of an associated drive circuit.

BACKGROUND OF THE INVENTION

In a switching power supply of the step-down type employing an N-channel transistor for a power device, the power transistor is driven by a bootstrapping or charge-pump voltage boosting technique. FIG. 1 herewith is a basic diagram of a bootstrapped power supply 1.

The above technique comprises charging a capacitor, called the bootstrap capacitor, which is placed between the output of the power device and the supply $V_{Drive}$ to the drive circuit or driver of the device. In FIG. 1, this bootstrap capacitor is referenced $C_b$. The supply voltage to the drive circuit is approximately the combined values of the supply voltage $V_{Pow}$ to the power device $T_1$ and the voltage at the capacitor $C_b$, i.e.:

$$V_{Drive} = V_{Pow} + V_{Cb} - V_{D0}.$$

Thus, the voltage drop $V_{gs}$ across the gate and source terminals of the power device $T_1$ is always near-constant under varying conditions of operation, i.e., on/off switching of the power device always provides good overdrive.

Assuming the capacitor $C_b$ to be in a charged initial state, when the power device $T_1$ is turned on, the node $V_{pow}$ is at $V_{cc}$, but the power device will stay on, since voltage $V_{Drive}$ is equal to $V_{cc} + V_{cb} - V_{D0}$.

Also, with the power device $T_1$ on, a current will be circulated such that, as the power device is switched off, the ratio $dI_L/dt$ makes the diode $D_1$ conductive and $V_{Pow} \approx 0V$. Accordingly, the capacitor $C_b$ will be charged by the voltage generator connected to it through the link 2 comprised of components $V_{Cb}$, $D_0$, $C_b$, and $D_1$. Of course, this operation would be feasible only when the coil contains sufficient energy to pull the cathode of the diode $D_1$ below ground.

The fundamental law for inductors, $\Delta V_L = -L \cdot dI_L/dt$, indicates that, in the above instance, with the output current $I_{Out}$ being small, $\Delta IL$ will be low, and $\Delta t$ finite, so that, when the power device changes over, the voltage variation across the coil will be insufficient to pull the cathode of diode $D_1$ below ground due to parasitic capacitances. Therefore, the capacitor $C_b$ cannot be charged within time $T_{off}$, and will keep being discharged due to a continual current draw from the drive circuit.

Thus a condition is ultimately reached of the supply voltage to the drive circuit being unable to drive the power device $T_1$ as expected.

An attempt at overcoming this problem is represented by European Patent Application No. EP 0 822 475, which is herein incorporated by reference.

However, the proposal of that patent application cannot overcome the problem at 100% duty cycle.

FIG. 2A is a plot with respect to time for a number of signals that are present in the power supply described in the above patent application. These signal plots clearly show that the above patent application will only drive the duty cycle of the PWM signal to 100% for one period, this PWM signal being the control signal to the power device $T_1$. Basically, the coil current is raised to a sufficient $\Delta V$ for the cathode of diode $D_1$ to be pulled to ground and the capacitor $C_b$ charged.

At the following cycle, when the duty cycle is driven to 0%, the increase in the coil current $\Delta I_L$ is large enough at low duty cycles to produce a voltage differential $\Delta V_L$ that can place the diode $D_1$ in forward conduction (proper operation).

FIG. 2B shows that at high duty cycles, the relative increase in the current $\Delta I_L$ is so small that the voltage differential $\Delta V_L$ is inadequate to place the diode $D_1$ in the forward mode. Thus, the aforementioned patent application cannot overcome the problem when conditions are as outlined above.

Consequently, there is a need for a power supply that can keep the bootstrap capacitor charged under conditions of a small current $I_L$ and a very high duty-cycle value (close to 100%). As discussed above, with prior art circuits the current will be so small that in this case it cannot pull the cathode of the loop diode below ground, and thus will inhibit the charge current to the bootstrap capacitor.

SUMMARY OF THE INVENTION

An embodiment of the present invention is a circuit having a second power device associated with the power device, wherein the second power device is managed by a logic drive circuit for pulling the potential at the drain terminal of the power device to ground and enabling the charge current to the bootstrap capacitor only when the loop diode cannot be turned conductive.

Advantageously, the second power device may be associated with any type of supply circuit that employs the bootstrapping technique. Based on this idea, the technical problem is solved by a power supply circuit, as previously indicated, being characterized in that it comprises a second power element, said second power element being associated with said power device, connected to said terminal node, and connected with a control terminal directly to the output of respective drive logic. Advantageously, the second power element is driven to turn on when a lower voltage than a predetermined minimum is present at the capacitor, thereby pulling the voltage at said terminal node to ground and further charging the capacitor.

BRIEF DESCRIPTION OF THE DRAWINGS

The features and advantages of the power supply circuit according to this invention will become understood from the following description of an embodiment thereof, given by way of non-limitative example with reference to the accompanying drawings.

DETAILED DESCRIPTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Figure 3:
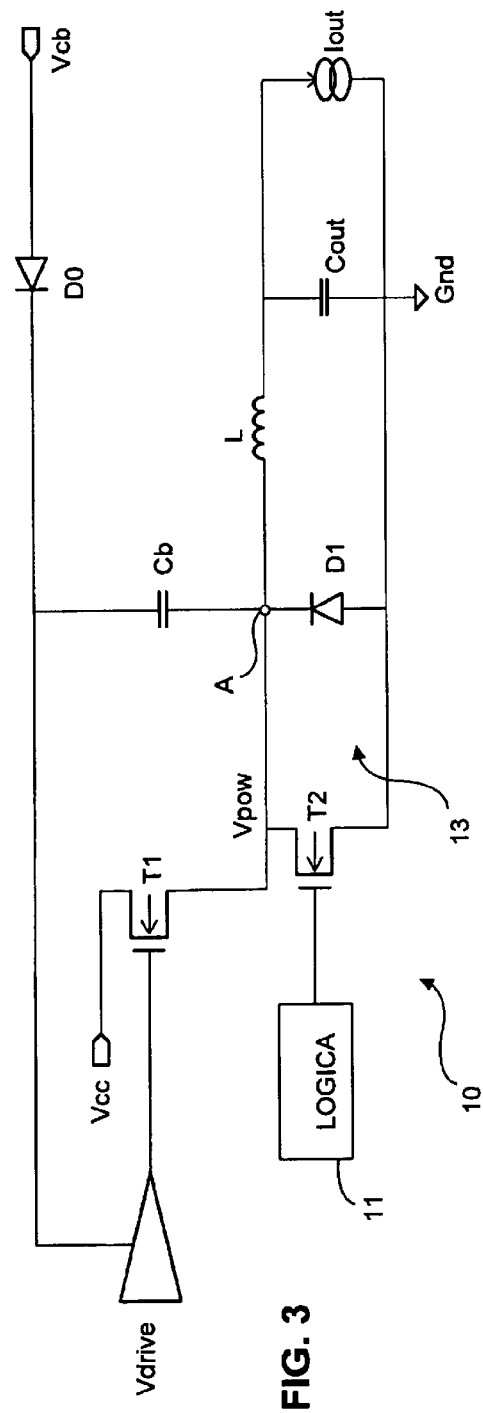
FIG. 3 shows schematically a power supply circuit according to an embodiment of the invention.
Figure 2A:
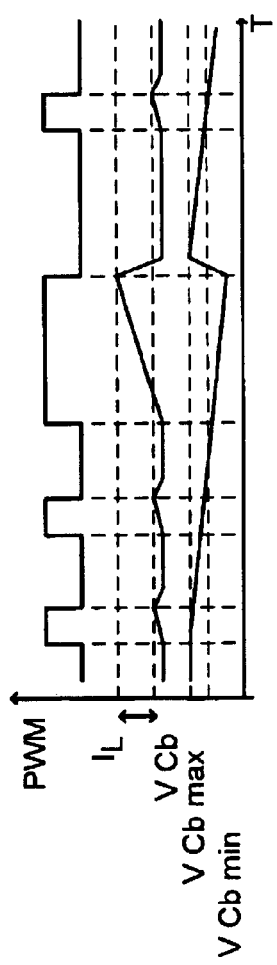
FIG. 2A shows plots against time for several signals, such as would be present in the power supply circuit of FIG. 1 during low duty-cycle operation according to the prior art.
Figure 2B:
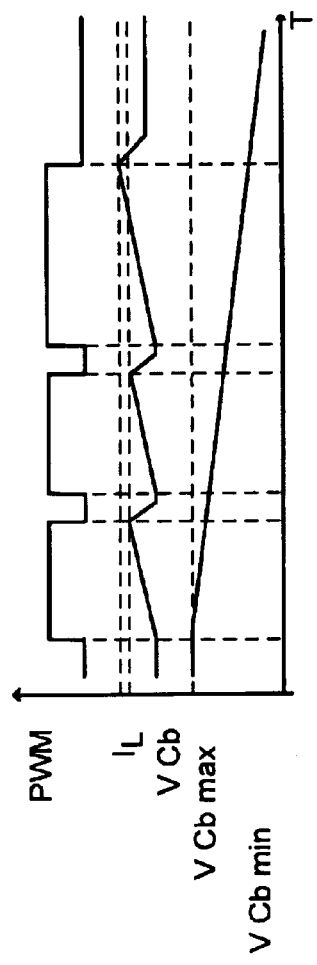
FIG. 2B shows plots against time for several signals, such as would be present in the power supply circuit of FIG. 1 during high duty-cycle operation according to the prior art.

With reference to the drawings, in particular to the example of FIG. 3, a power supply circuit for optimum bootstrap capacitor charging, according to an embodiment of this invention, is shown generally at 10 in schematic form.

Preferably, the circuit 10 would be used as a step-down switching power supply. However, there is no reason why the circuit 10 could not be used in other applications where a capacitor of a given capacitance was to be charged in an optimum manner.

Figure 1:
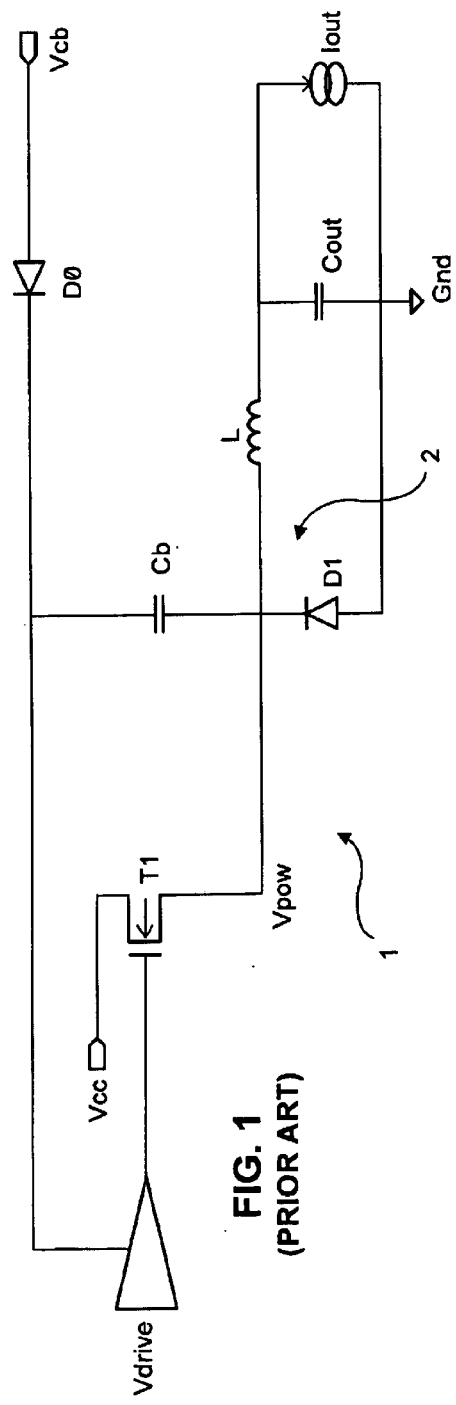
FIG. 1 shows schematically a power supply circuit according to the prior art.

As shown best in FIG. 3, the differences of the inventive circuit 10 from a conventional design like that shown in FIG. 1 are apparent. A power device $T_1$ is connected to a terminal node A of a capacitor $C_b$, the latter also having an output circuit LC connected to it. A second power element, in particular a transistor $T_2$, is associated with the power device $T_1$ of FIG. 1 and connected to the node A, it being driven directly from dedicated drive logic 11.

Generally, the second power element $T_2$ is controlled from a logic circuit 11 to pull to ground the potential at its drain terminal, thereby allowing the charge current to the capacitor $C_b$ to go through the link 13 that includes elements such as $V_{Cb}$, $D_0$, $C_b$, and $T_2$. The second power element $T_2$ would take over whenever the diode $D_1$ is prevented from turning conductive. Thus, when the coil lacks sufficient energy to allow the capacitor $C_b$ to be charged, i.e. when the voltage $V_{Cb}$ at the bootstrap capacitor is below an admissible minimum for the system, the power element $T_2$ will be turned on and pull the voltage $V_{Pow}$ at node A to ground, so that the capacitor $C_b$ can be charged. This removes typical malfunctions of such circuit designs.

Figure 4:
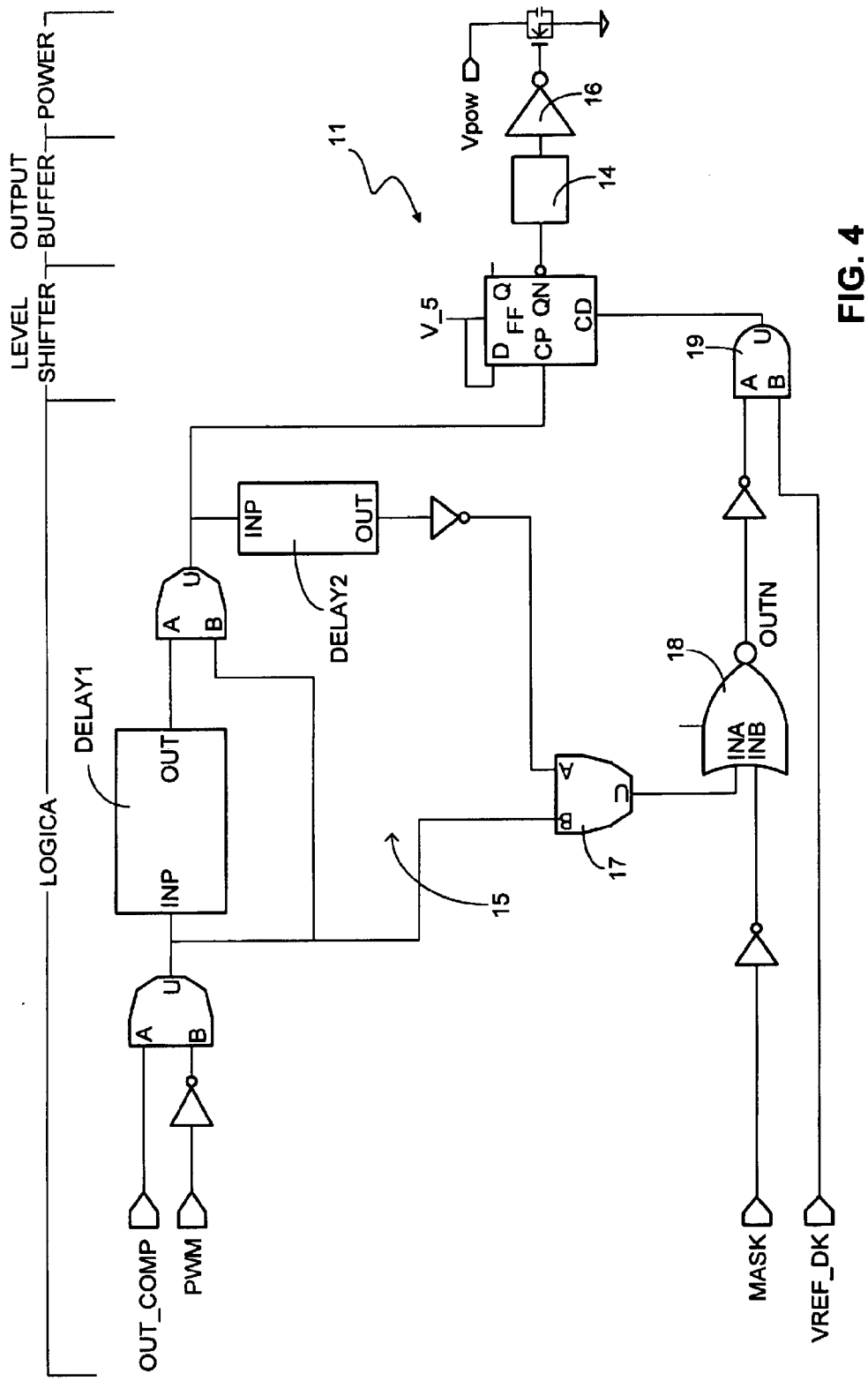
FIG. 4 is a more detailed view of the power supply circuit according an embodiment of to the invention.

FIG. 4 shows the construction of the logic circuit 11 in greater detail. The construction of the logic circuit 11 can be said to include the three parts specified here below:

an output buffer stage 16 connected directly to a control terminal of the second power element $T_2$;

a level-shift circuit 14 operative to raise the voltage to the buffer stage 16, the circuit 14 shifting the voltage level to 12V from 5V;

a logic network 15 driving the level-shift circuit 14 by appropriate outputs from the power supply.

Figure 3A:
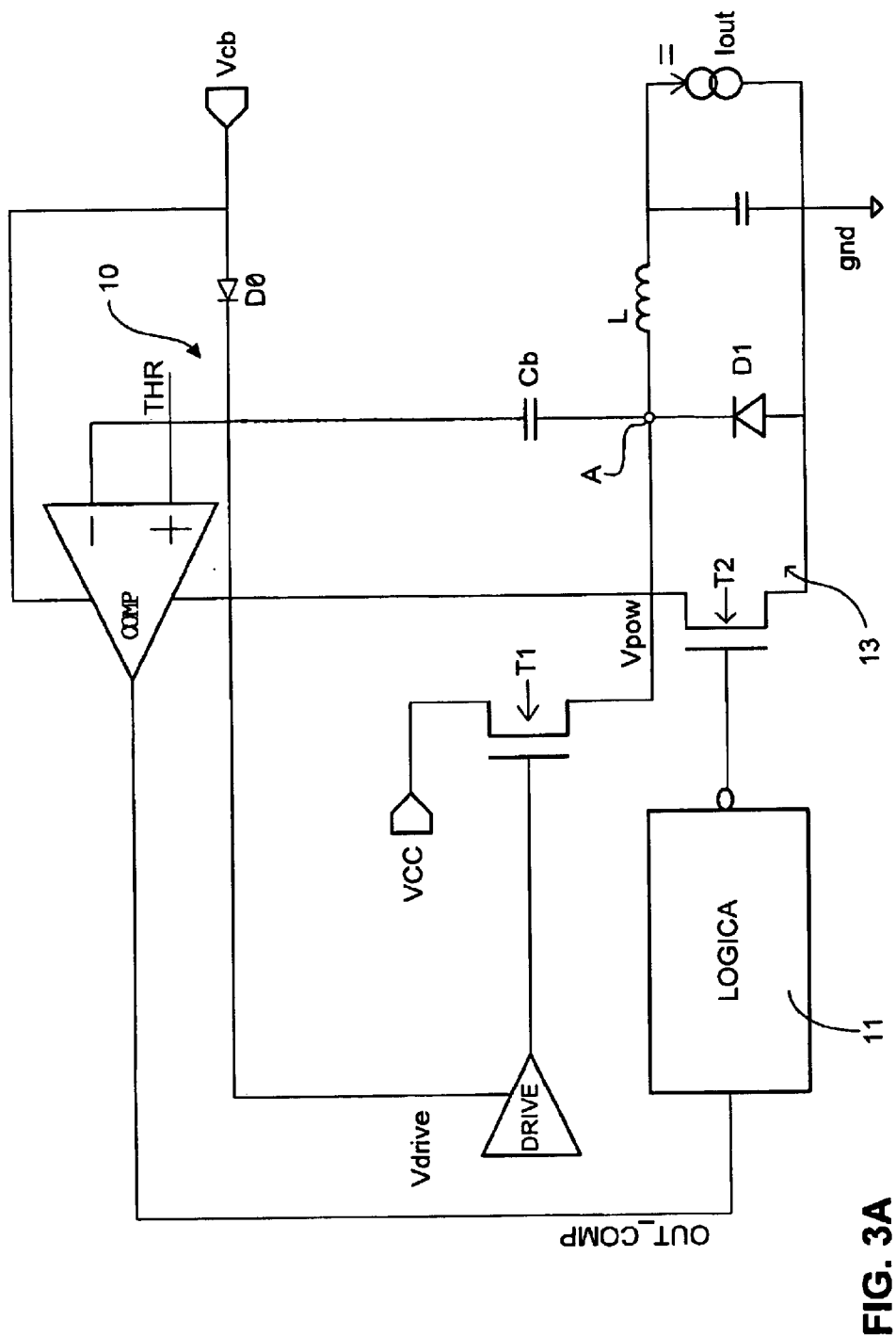
FIG. 3A shows schematically a power supply circuit according to another embodiment of the invention.

FIG. 4 also shows that the logic circuit 11 is input four signals, namely:

Referring to the circuit 10 of FIG. 3A, which is similar to the circuit 10 of FIG. 3 but for the addition of a comparator COMP. OUT_COMP is the output from the comparator COMP, which is arranged to compare the value of the voltage $V_{Cb}$ across the bootstrap capacitor to a predetermined threshold THR; upon this voltage falling below THR, the comparator output is changed over, and is again changed over upon the voltage $V_{Cb}$ exceeding a second set value "Hist";

PWM: this is the signal that drives the power device $T_1$ in the control loop;

VREF_OK: this is a signal from a band-gap voltage regulator which will take a high value as the system supply voltage attains steady state; broadly in the circuit of this embodiment, this is an enable signal to the logic network 15 for a proper start-up of the logic circuit 11;

MASK: this signal monitors the voltage at the terminal "Pow"; in practice, it detects the moment that the voltage $V_{pow}$ goes below a given value, i.e. that the bias of diode $D_1$ changes from reverse to forward.

Let us see now the construction and operation of the logic circuit 11 in greater detail. As the signal OUT_COMP takes a high value, corresponding to the bootstrap voltage being below its designed minimum, the negation of PWM will generate a pulse through a delay block Delay$_1$ causing the negated output Q of a flip-flop FF to go low.

This takes place over a sufficiently long time to ensure that the power device $T_1$ is off. Since the buffer stage 16 is to invert the output signal from the flip-flop FF, the power element $T_2$ will be conducting (ON). A reset signal is generated to the flip-flop FF through a second delay block Delay$_2$, causing the power device $T_2$ to stop conducting.

If before the resetting pulse comes in from the second delay block Delay$_2$ the potential $V_{Pow}$ already is above the sensitivity threshold of the signal MASK, this signal is propagated to the flip-flop FF through a series of logic gates, 18 and 19, and resets the logic network 15 such that the power element $T_2$ can be opened.

It should be noted that this system maximizes the efficiency of charging the capacitor $C_b$, because the time for closing the power element $T_2$ is not made longer than is strictly required for charging the capacitor by the provision of the two delay blocks, the network of logic gates connected to the blocks to generate the pulses, and the signal MASK.

Should the power element $T_2$ be held on for a longer time than is required for the supply circuit to operate properly, i.e. until the voltage $V_{Pow}$ is approximately 0V, then the node at potential "Pow" would see its voltage raised by the power element $T_2$ becoming current-saturated, $I_{T2}=I_{Cb}+I_L$. Under this condition, the capacitor $C_b$ is no longer charged, and merely the output voltage from the supply circuit is discharged.

Figure 5:
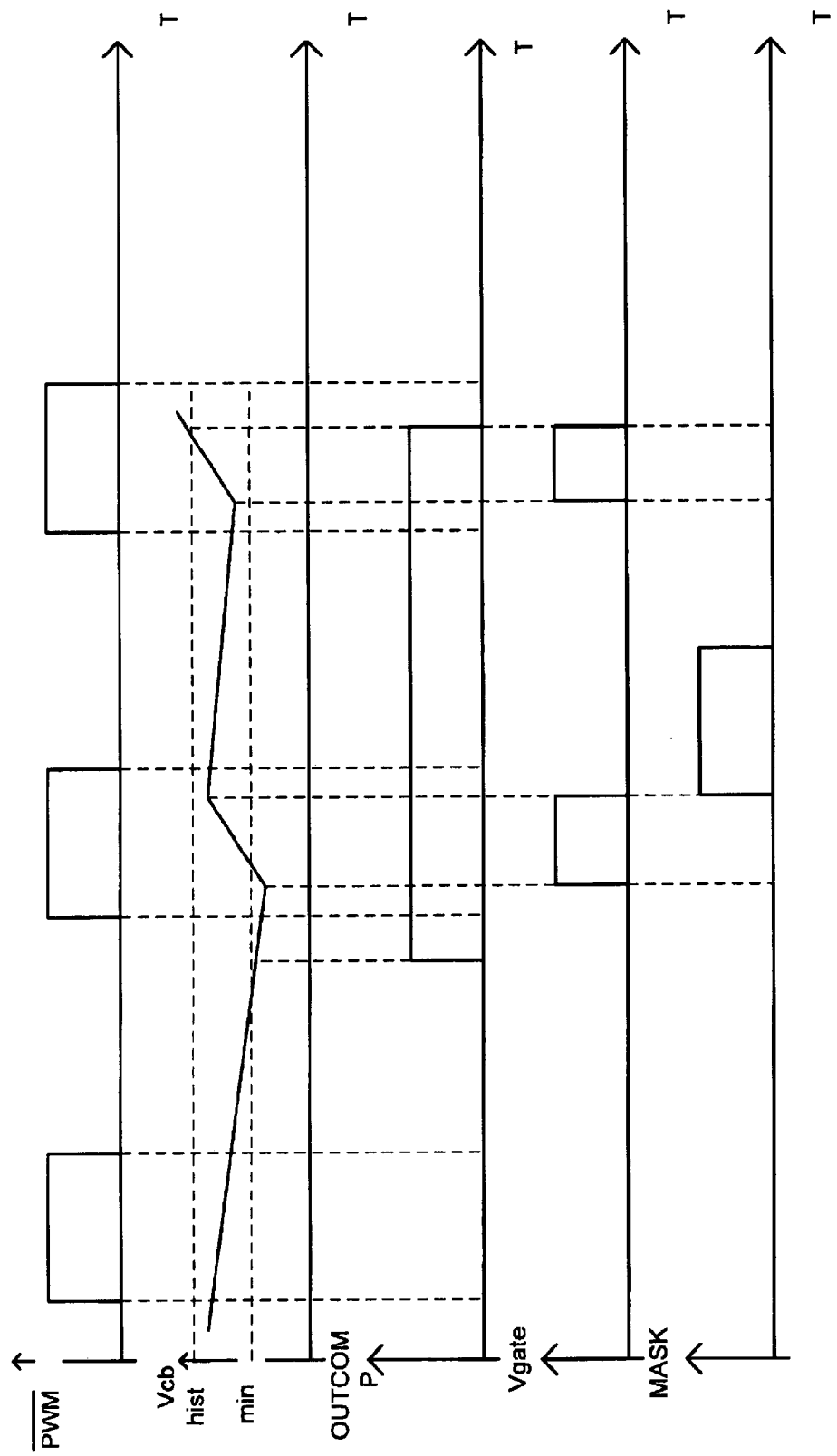
FIG. 5 shows plots against time for several signals, such as would be present in the power supply circuit of FIG. 4 during high duty-cycle operation according to an embodiment of the invention.

FIG. 5 shows, by way of example only, waveforms plotted against time for a number of signals present in the logic network 15. How the voltage $V_{gate}$ at the gate terminal of the power element $T_2$ varies with the other signals is readily evinced from these plots.

The first pulse of voltage $V_{gate}$ goes high with a time delay over PWM, as due to the block Delay1. This voltage signal goes low again because it is assumed that the diode $D_1$ will change from a reverse bias to a direct bias. The second, shorter pulse of $V_{gate}$ changes to low from high upon the voltage $V_{C_b}$ at the bootstrap capacitor exceeding a threshold $V_{Hist}$. Accordingly, OUT_COMP goes low again and resets the flip-flop FF.

Briefly, the power supply circuit of this embodiment solves the technical problem and affords several advantages, foremost among which is the fact that the problems connected with charging the bootstrap capacitor $C_b$ at any duty-cycle values of the system are now overcome.

In addition, the system performance is improved by that the energy expended to charge the capacitor $C_b$ is now minimized.

Figure 6:
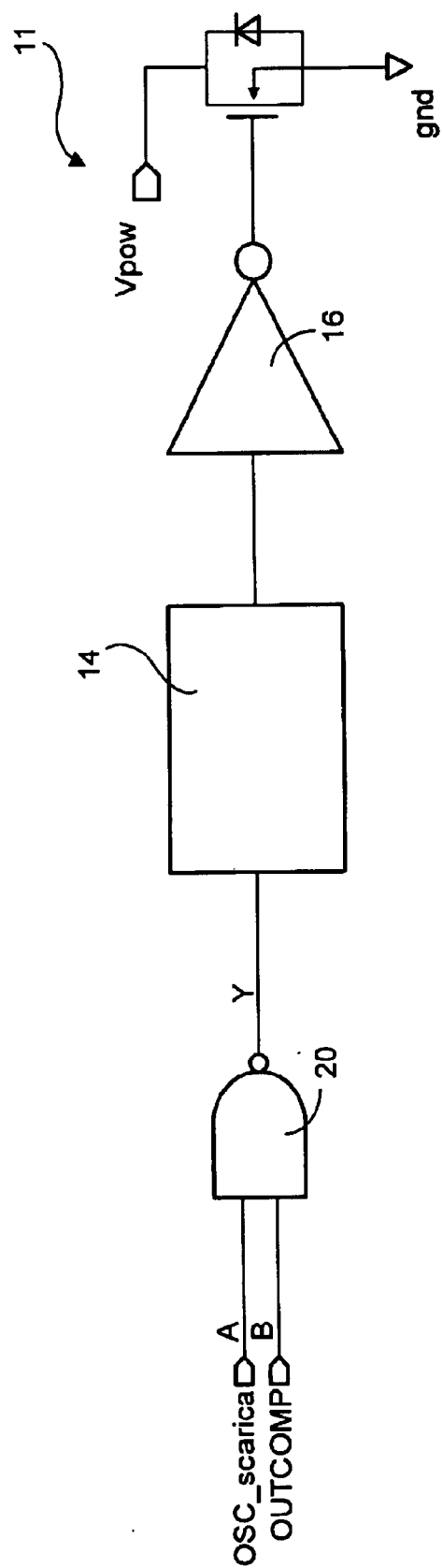
FIG. 6 shows a second embodiment of a portion of the power supply circuit of FIG. 3.
Figure 7:
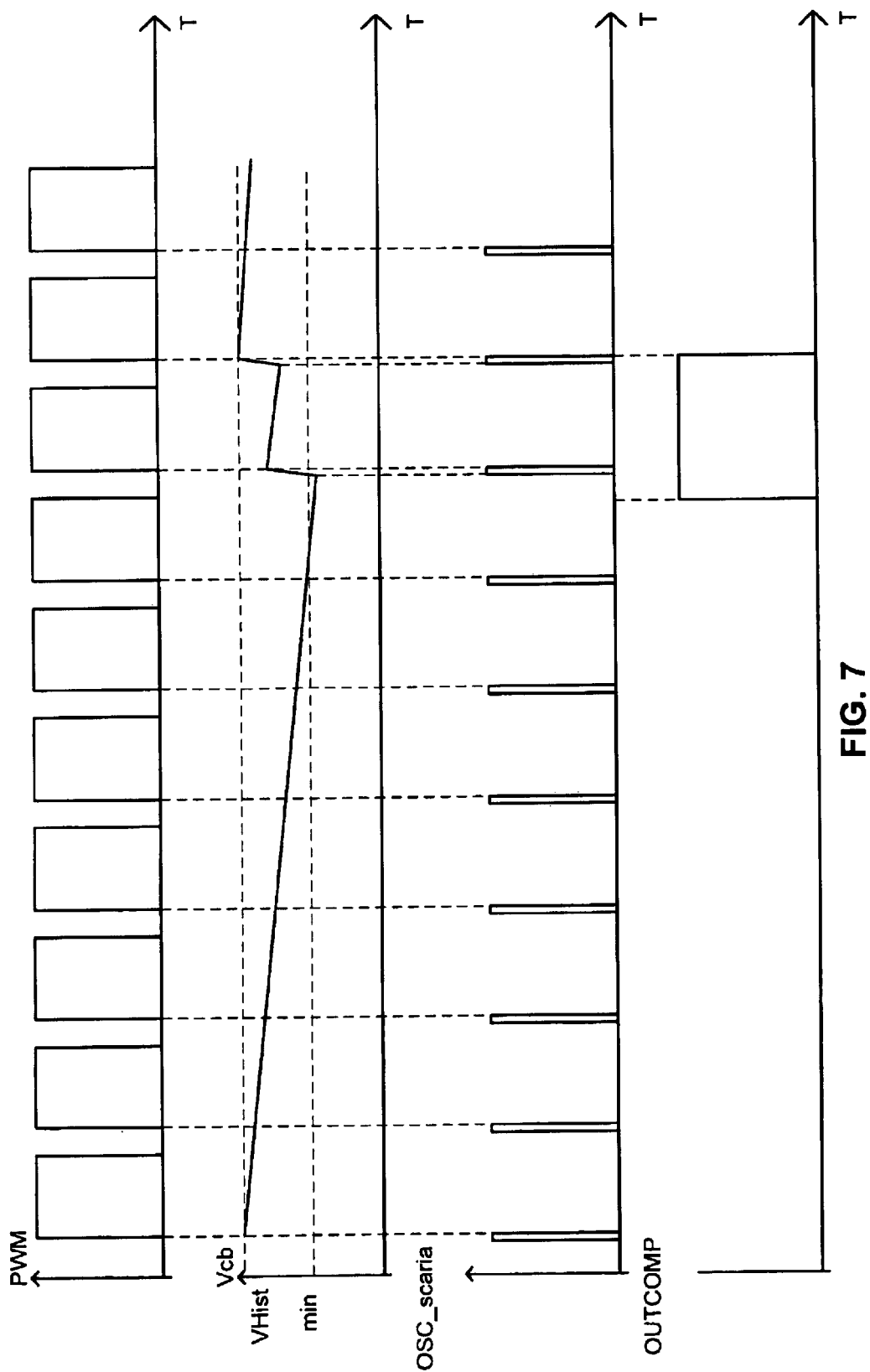
FIG. 7 shows plots against time for several signals, such as would be present in the power supply circuit of FIG. 6 during high duty-cycle operation according to an embodiment of the invention.

A second embodiment of the logic circuit 11 associated with the second power element will now be described with reference to the example of FIG. 6. Compared to the previously described embodiment, this embodiment is no optimum as far as optimizing the system efficiency is concerned, yet does overcome the problem of discharging the bootstrap capacitor.

Thus, the second embodiment further overcomes the problem of charging the capacitor $C_b$ at values of the system duty cycle close to 100%.

Compared to the previously described embodiment, the bootstrap capacitor $C_b$ is not charged in an optimum manner because neither the signal MASK nor the delay blocks Delay1 and Delay2 for controlling the power element $T_2$ are utilized. This embodiment only uses two signals: OUT_COMP and OSC_scarica.

These signals are each applied to a respective input of a logic gate 20, preferably a NAND gate. The output of the logic gate 20 is connected directly to the input of the level shifter 14.

The signal OSC_scarica controls discharge of the sawtooth that, in switching power supplies of this type, is necessary in order to produce fixed-frequency PWM.

As the signal OUT_COMP goes high, this corresponding to the bootstrap voltage being below its designed level, each pulse OSC_scarica will close the power element $T_2$ and hold it closed through the duration of the latter. Thus, the capacitor $C_b$ is charged, and upon attaining steady state, OUT_COMP will go to a logic low. As a result, the following pulses OSC_scarica are disabled, thereby enabling the power element $T_2$ by short pulses only when required. Although efficiency is not optimized in this way, a significant step toward maximization is made.

What is claimed is:

1. A switching power supply circuit for optimum capacitor charging, wherein a power device is coupled to a first terminal node of a capacitor to be charged and has a control terminal coupled to the output of an associated drive circuit having a supply node coupled to a second terminal node of the capacitor, wherein the switching power supply circuit comprises a second power element being associated with said power device, coupled to said first terminal node, and provided with a control terminal which is connected directly to an output of a respective drive logic circuit, and wherein the drive logic circuit turns on said second power element in response to a voltage below a predetermined minimum being present at the second terminal node of the capacitor, thereby pulling the voltage at said first terminal node to ground and further charging the capacitor.

2. A power supply circuit according to claim 1, wherein said second power element is a MOS power transistor having a drain terminal coupled to said first terminal node.

3. A power supply circuit according to claim 1, wherein said drive logic comprises:
    an output buffer stage connected directly to the control terminal of the second power element;
    a level-shift circuit arranged to raise the voltage to the buffer stage; and
    a logic network driving the level-shift circuit.

4. A power supply circuit according to claim 3, wherein said logic network comprises:
    a set of logic gates;
    at least one pair of delay blocks; and
    a storage element.

5. A power supply circuit according to claim 3, wherein said logic network has four signal inputs.

6. A power supply circuit according to claim 3, wherein said logic network comprises a two-input NAND gate.

7. A power supply circuit according to claim 1, wherein said capacitor to be charged is a bootstrap capacitor of a voltage booster.

8. A power supply circuit comprising:
    a bootstrap capacitor coupled between a load terminal and a voltage supply terminal;
    a first power circuit coupled to the load terminal and operable to supply power to the load terminal; and
    a second power circuit coupled to the load terminal and operable to charge the bootstrap capacitor in response to the voltage across the capacitor falling below a predetermined threshold voltage.

9. The power supply circuit of claim 8 wherein the first power circuit comprises a MOS transistor having a source terminal coupled to the load terminal and a drive circuit coupled to the voltage-supply terminal and operable to drive the MOS transistor.

10. The power supply circuit of claim 8 wherein the second power circuit comprises a MOS transistor having a drain terminal coupled to the load terminal.

11. The power supply circuit of claim 8 wherein the second power circuit comprises:
    a transistor having a drive terminal coupled to the load terminal and having a control terminal;
    an output buffer stage coupled to the control terminal of the transistor;
    a level-shift circuit operable to raise the voltage to the buffer stage; and
    a logic network operable to drive the level-shift circuit.

12. The power supply circuit of claim 11 wherein the logic network further comprises:
    a set of logic gates;
    at least one pair of delay circuits coupled to the set of logic gates; and
    a storage element coupled to the at least one pair of delay circuits.

13. The power supply circuit of claim 12 wherein the set of logic gates comprises four signal input nodes.

14. The power supply circuit of claim 12 wherein the set of logic gates comprises two-input NAND gates.

15. The power supply circuit of claim 8 further comprising a comparator operable to compare the voltage across the bootstrap capacitor to the threshold voltage, the comparator generating an output signal for turning on the second power circuit when the voltage across the bootstrap capacitor falls below the threshold voltage.

16. A method comprising:
    driving a load with a power circuit;
    driving the power circuit with a boosted voltage from a bootstrap capacitor;
    monitoring a voltage across the bootstrap capacitor; and
    charging the bootstrap capacitor in response to the voltage across the bootstrap capacitor being lower than a first predetermined threshold voltage.

17. The method of claim 16 wherein charging the bootstrap capacitor comprises charging the bootstrap capacitor when the power circuit is inactive.

18. The method of claim 16 wherein charging the bootstrap capacitor comprises charging the bootstrap capacitor when a voltage at a load-driving node is greater than a second predetermined threshold.

19. The method of claim 16 wherein charging the bootstrap capacitor comprises charging the bootstrap capacitor when a voltage at a load-driving node is less than a second predetermined threshold.

20. The method of claim 16, further comprising halting the charging of the bootstrap capacitor in response to the voltage across the bootstrap capacitor exceeding a second predetermined threshold.

21. The method of claim 16, further comprising halting the charging of the bootstrap capacitor after a predetermined time.

22. The method of claim 16 wherein charging the bootstrap capacitor comprises charging the bootstrap capacitor a predetermined time after the power circuit becomes inactive.

* * * * *